United States Patent [19]

Bishop et al.

[11] Patent Number: 4,685,132
[45] Date of Patent: Aug. 4, 1987

[54] BENT SEQUENCE CODE GENERATOR

[75] Inventors: F. Avery Bishop, Salt Lake City, Utah; Steven L. Bennett, Seattle, Wash.

[73] Assignee: Sperry Corporation, Blue Bell, Pa.

[21] Appl. No.: 760,641

[22] Filed: Jul. 30, 1985

[51] Int. Cl.⁴ .......................... H04L 9/04; H03K 3/84
[52] U.S. Cl. ....................................... 380/46; 380/34; 380/50; 364/717; 340/347 DD
[58] Field of Search ............... 178/22.08, 22.09, 22.15, 178/22.19; 375/2.1, 2.2; 364/717, 725, 718; 340/347 DD; 380/23, 25, 34, 46, 49, 50

[56] References Cited

U.S. PATENT DOCUMENTS

| | | | |
|---|---|---|---|
| 3,654,604 | 4/1972 | Grafton | 178/22.15 |
| 3,984,668 | 10/1976 | Zetterberger et al. | 364/717 |
| 3,988,538 | 10/1976 | Patten | 178/22.19 |
| 4,068,311 | 1/1978 | Whitehouse et al. | 364/827 |
| 4,162,480 | 7/1979 | Berlekamp | 364/200 |
| 4,447,672 | 5/1984 | Nakamura | 178/22.19 |
| 4,450,321 | 5/1984 | Quigley et al. | 178/22.19 |
| 4,470,022 | 9/1984 | Cepnius et al. | 364/717 |
| 4,493,046 | 1/1985 | Watanabe | 364/717 |
| 4,568,915 | 2/1986 | Gutleber | 340/347 DD |

OTHER PUBLICATIONS

IEEE Trans. Info. Theo., vol. I, T-28, No. 6, (11/82), pp. 858-864, Olson et al., "Bent. Function Sequence".

Primary Examiner—Salvatore Cangialosi
Attorney, Agent, or Firm—G. Donald Weber, Jr; Glenn W. Bowen

[57] ABSTRACT

A method and apparatus for generating a bent sequence code as a transform of an m-sequence code.

24 Claims, 6 Drawing Figures

BENT SEQUENCE CODE GENERATOR

BACKGROUND

1. Field of the Invention

This invention is directed to a code generator, in general, and to a code generator which produces and uses a bent sequence code, in particular.

2. Prior Art

There are many known methods and applications for producing and using code signals. Many of these methods and applications are related to security considerations. Thus, secure transmissions are highly necessary. On the other hand, because of ongoing countermeasures, the types of secure transmissions are always being evaluated and new codes and code formats are being devised.

These codes and code formats include many applications. One such application is referred to as "spread spectrum". Spread Spectrum is a technique of processing a signal which occupies a certain bandwidth of the spectrum in order to spread its energy over a wider region of the spectrum.

There are several reasons for using this technique.

1. For jamming protection. When the energy of the transmitted signal is spread over a wide region of the spectrum, the receiver of the signal picks up what was transmitted along with any interference. However, the receiver also has signal information which it has about the method and 1 or means which was used to spread the signal. The receiver uses this information and despreads the signal. In other words, the receiver uses a code which is called a PN code (a pseudo-noise code) to despread the signal and collapse the spectrum back to the natural bandwidth which it would have occupied without the spreading. In so doing, it spreads the interference and its energy over a wider bandwidth. The receiver then looks at the natural bandwidth which the data would have occupied. As a result, very little of the interference energy is left in the natural bandwidth because the interference signal has been spread as well.

2. To make signals more covert. When the signal energy is spread over a wider bandwidth the signal energy is lower at any given point in the spectrum. In other words, a high concentration of energy which is spread over a wider range produces a signal which is hidden down in the noise more easily and is, therefore, harder to detect. Thus, in addition to "covertness" (i.e., detection difficulty), the data have now been encoded by a certain spread code.

3. For ranging. This is, typically, used is in deep space communications, radar and the like, in order to determine how far away things are.

There are many ways to spread a spectrum. One of the most common and most useful is called "direct sequence" in which the data, whether some type of voice signal or bits (e.g. 1's and 0's) that contain some type of information, are multiplied by a PN code (a pseudo-noise code). The PN code is a code of 1's and 0's. The shortest duration of time that the code remains a 1 or a 0 is called a "chip time". The 1's and 0's that comprise the data are called bits, and the shortest duration during which the bit remains constant is called a bit time. In using this PN code, it is necessary to multiply the bits by the chips. The chips are of much shorter duration than are the bits. For example, if a bit is a millisecond in duration, a chip might be a microsecond. Thus, if the PN code remains a 1 for one microsecond, it has the option of going from a 1 to 0 or it can remain a 1 for another microsecond. However, the probability is about ½ that the bit will switch over to 0. What makes the code especially effective is that the chips are approximately random. Thus, to a third party observer, not privy to the code sequence that the transmitter and the receiver have, these 1's and 0's appear random. Thus, the designation of pseudo-noise codes.

One means of making a PN code appear really random is by using an m-sequence (i.e., maximal sequence). This is accomplished by means of a feedback shift register in which the output of the shift register (a 1 or a 0) is fed back into the shift register at certain locations. This technique is known in the art.

One example is described in copending application Ser. No. 626,127 to R.L. Currie, entitled HIGH SPEED M-SEQUENCE GENERATOR AND DECODER CIRCUIT , filed on June 29, 1984 and assigned by the common assignee. The locations are determined by what is called an irreducible polynomial over a Galois field. Also, the output is usually shifted or added in modulo 2 type arithmetic or using an exclusive OR type logic. The PN code comprises a sequence which is periodic and repeats. Thus, with a sequence length of 1024, 4096 or even longer, given any 2m code elements, where m is the length of the shift register of those consecutive elements of the code in a row, one can determine what the tap hookups would be and break the codes essentially using the Massey algorithm, primarily because the complexity is linear.

Another problem with the conventional m-sequence approach is that different PN codes require that the feedback taps be re-arranged. However, only certain arrangements will yield an m-sequence. In some cases it may be very difficult because there is essentially an exclusive OR gate on each tap in the shift register. Thus, the knowledge of exactly which sets of taps will work would have to be stored and transmitted in this system.

There are advantages of the bent sequence generator.

1. Complexity. It is very complex. That is, the number of chips required to decode the sequence is much larger than in the m-sequence code. Some computer simulations show that the number of chips required to break the code may be 100's of times larger than that required for normal m-sequence. Because it has high complexity, the bent sequence code is very difficult to break.

2. Ease of code change in the hardware. As disclosed herein, it is very easy to switch from one code to a different code of the same length merely by changing switch settings which can be used on some apparatus. Conversely, in a VLSI embodiment, the settings can be controlled by applying inputs to the chip. Thus, bent sequences are very versatile and many codes can be easily generated from the same equipment without any modification of equipment except changing switch settings.

3. Low cross-correlation. The bent sequence codes have a 3-valued auto-correlation function which is better by a factor of $\sqrt{2}$ than ordinary gold codes.

Probably, the only disadvantage with bent sequence codes is that the hardware complexity is greater. That is, it requires many more chips than building an m-sequence code.

SUMMARY OF THE INVENTION

This invention is directed to a method and apparatus for generating a bent sequence code. In particular, this code generation is achieved by means of a non-linear transformation of a length 4095 m-sequence. The particular transformation is determined by selecting a permutation of eight numbers and a sign inversion vector of length 8. As a result, 10,321,920 (8! $2^8$) possible codes are available to generate PN codes (comprising 1's and 0's) for use in spread spectrum communication systems.

The apparatus to achieve this code generation includes a shift register of prescribed length, which, in a preferred ebodiment, must be a multiple of 4 (m=4k). The shift register produces a signal referred to as a state vector. A linear transformation device produces two output vectors of length (k). A fixed permutation device operates upon one of the k length vectors and produces a permuted vector. The permuted vector and the other vector from the linear transformation device are used as address indices on a Hadamard matrix. The element of the matrix indicated by these address indices is the matrix ouput.

Also, the permuted vector signal is supplied to a sign inversion device. A modulo 2 adder combines the signal from the Hadamard matrix and the signal from the sign inversion device. A second modulo 2 adder combines the signal from the first modulo 2 adder and a selected portion of the state vector produced by the shift register. The output of the second modulo 2 adder comprises the bent sequence code signal.

In an optional embodiment, one or more PN sequences can be combied with the bent sequence code signal using a modulo 2 adder to produce a composite PN code.

DESCRIPTION OF A PREFERRED EMBODIMENT

Figure 1:
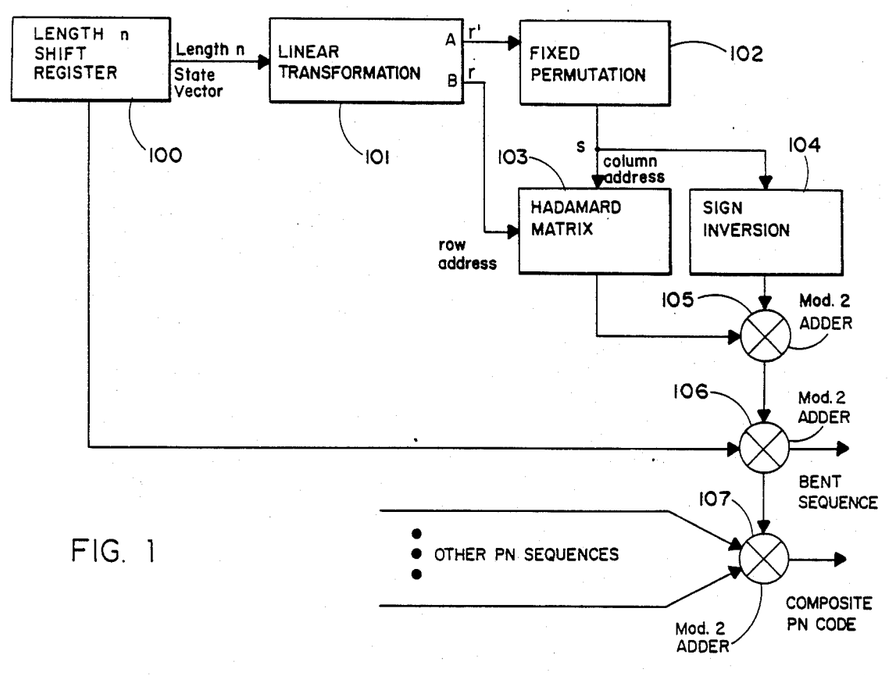
FIG. 1 is a block diagram of the apparatus and the method of the instant invention.

Referring now to FIG. 1, there is shown a block diagram which represents the overall arrangement of the apparatus of the instant invention. In addition, FIG. 1 also represents a flow chart which depicts the method encompassed by the instant invention.

To generate the bent sequence, the first part of the apparatus that is necessary is the length n shift register 100. This shift register is similar to the shift registers discussed above relative to m-sequence generators. However, in the preferred embodiment there is one constraint that must be met, viz. n must be divisible by 4. That is to say, n =4K where K is some integer. In one example, n =12 and K =3. In operation, the first thing that is done is that the signal which is called the state vector of the shift register 100 is transformed by linear transformation device 101. By state vector is meant the set of elements in the shift register. For example, if it is a length 12 register then it is the 0's and 1's contained in the shift register. If it is a maximal length shift register, in other words if tap hookups are given by a primitive polynomial, there are $2^n-1$ possible states or conditions possibilities for the shift register to take. Thus there are $2^n-1$ possible states the state vector can take, e.g. in this case the states are 1 to 4095. A state vector comprises 12 elements which are 0's and 1's in the register at that point.

In the transformation step performed in the linear transformation unit 101 these n elements, considered a vector, are multiplied by a matrix, also of 0's and 1's, in the normal sense of matrix multiplication, with the exception that addition is modulo 2. All elements of this matrix are multiplied by the state vector. All of these elements are 0's and 1's also whereby all operations are done modulo 2. This produces a linear transformation. The matrix is of size n/2×n. Thus, the matrix of this linear transformation, produces an n/2 length vector which is broken down into two n/4 or k length vectors. The first k elements are considered one vector and the second k elements are considered another vector. Thus, a length n state vector, through a linear transformation performed in unit 101, is mapped into a length n/2 vector. The first half of those n/2 elements are taken as one vector and the second n/2 elements are taken as another vector.

In the preferred embodiment, the lower order, i.e. the first k elements, are used, unchanged, as a row address for the hadamard matri 103. The higher order, or second k elements, are passed through a fixed permutation network 102. The k elements in the vector are used to represent a number base 10. For example in the exemplary, case n=12, and k=3. Thus, the vector represent a number from 0 to 7. A fixed mapping maps all the numbers 0-7 depending on the vector produced by the linear transformation device 101 at terminal A. Because it is a fixed transformation is utilized, every time a 0 is produced it is always mapped to the same value thing. Likewise every time a 7 is produced it is mapped to the same value. For example, a 7 can be mapped to a 3, depending upon the transformation operation. The permutation is fixed during any one run of the code but it is under the control of the user and can be selectable by switches in the hardware.

The output of the permutation device 102 is the signal s. Thus, the system produces r and s signals. That is, signal r is the first or the lower order elements of the first k elements of the output of the linear transformation 101 which are used unchanged. Signal s is the higher order of k elements, which have been transformed through a fixed permutation to produce a column address. The r and s signals are used as a row address and a column address of a Hadamard matrix in the storage device 103. The row address and column address are each a set of k bits. These are interpreted as a number between 0 and 2−1. These signals are used to access an element of a p by p Hadamard matrix (where $p=2^k-1$) which is defined in the literature. The output of the Hadamard matrix 103 is modulo 02 added, with a sign inversion. Stated otherwise, the output signal s from the permutation device 102 is interpreted as a number from 0 to p. Depending upon that value, the output of the Hadamard matrix 103 will be inverted or not. For example, if k =3 and p =7, the user, through switches in inversion device 104 assigns an inversion vector from 0 through 7. A typical signal might be 1100111 in which 1 indicates sign inversion, and a 0 indicates no sign inversion. If s=0, then that would invert; s=1, it would invert; if s=2, it would not be inverted, and so on. Thus, the output of the sign inversion block 104 is again 0 or 1 as selected by s. That output signal is modulo 02 added (which is equivalent to a sign inversion) at adder 105 with the output of the Hadamard matrix 103.

The output of adder 105 is modulo 02 added at adder 106 with a prescribed element or bit of the signal provided by the shift register 100. In the embodiment shown, it is the n-1 (i. e. last) entry of the state vector which is modulo 02 added with the output of the sign inversion adder. The signal produced by adder 106 is the output of the bent sequence generator.

Figure 2:
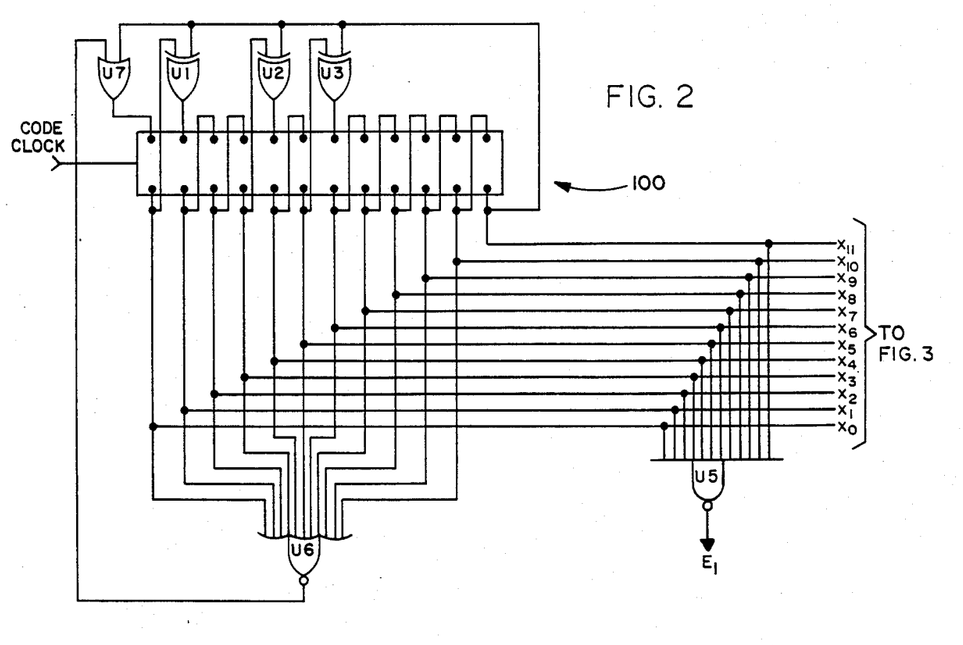
FIGS. 2 through 5 are schematic diagrams of the several components of the instant invention.

Referring now to FIG. 2, there is shown, in greater detail, the length n shift register 100 of FIG. 1. That is, shift register 100 is implemented as an ordinary shift register which uses a bank of 12 D-type flip-flops (or flip-flop stages) and three exclusive OR-gates. The shift register is driven by a code clock signal. It is seen that the outputs of flip-flops 1-2,5 and 7-10 are connected directly to the inputs of the next adjacent flip-flop stages. On the other hand, the outputs of flip-flop stages 0, 3 and 5 are each connected to an input terminal of an Exclusive-OR gate U1, U2 and U3, respectively. The outputs of the Exclusive-OR gates U1, U2 and U3 are connected to the inputs of the flip-flop stages 1, 4 and 6, respectively. Also, the output of flip-flop stage 11 is connected to the input of stage 1 via OR gate U7 and to another input of each of the Exclusive-OR gates U1, U2 and U3, noted above. As well, the output of each of the 12 flip-flop stages is made available to provide an output signal of 12 bits identified as signals $X_O$ through $X_{12}$. Other configurations of the shift register 100 can be used in some other applications. Also, in order to produce a composite PN code, as referenced relative to FIG. 1, additional code generators, e.g. m-sequences, are provided.

In addition, the circuit of FIG. 2 includes NOR gate U6 which is connected to receive all of the outputs from the shift register. The output of NOR gate U6 is returned to the input of flip-flop stage 1 via OR gate U7. This connection is used to assure that the system does not lock up with an all 0's state vector. If all outputs $X_0$ through $X_{11}$ are 0, the NOR gate U6 will produce a 1 which is returned to stage 1 via OR gate U7.

The NAND gate U5 is used to detect an all 1's condition. This is primarily a test function device which is easily implemented in a VLSI fabricated system. This can also be used as an "epoch" code generator to produce the output signal E1 indicate a particular status of the code sequence.

Figure 3:
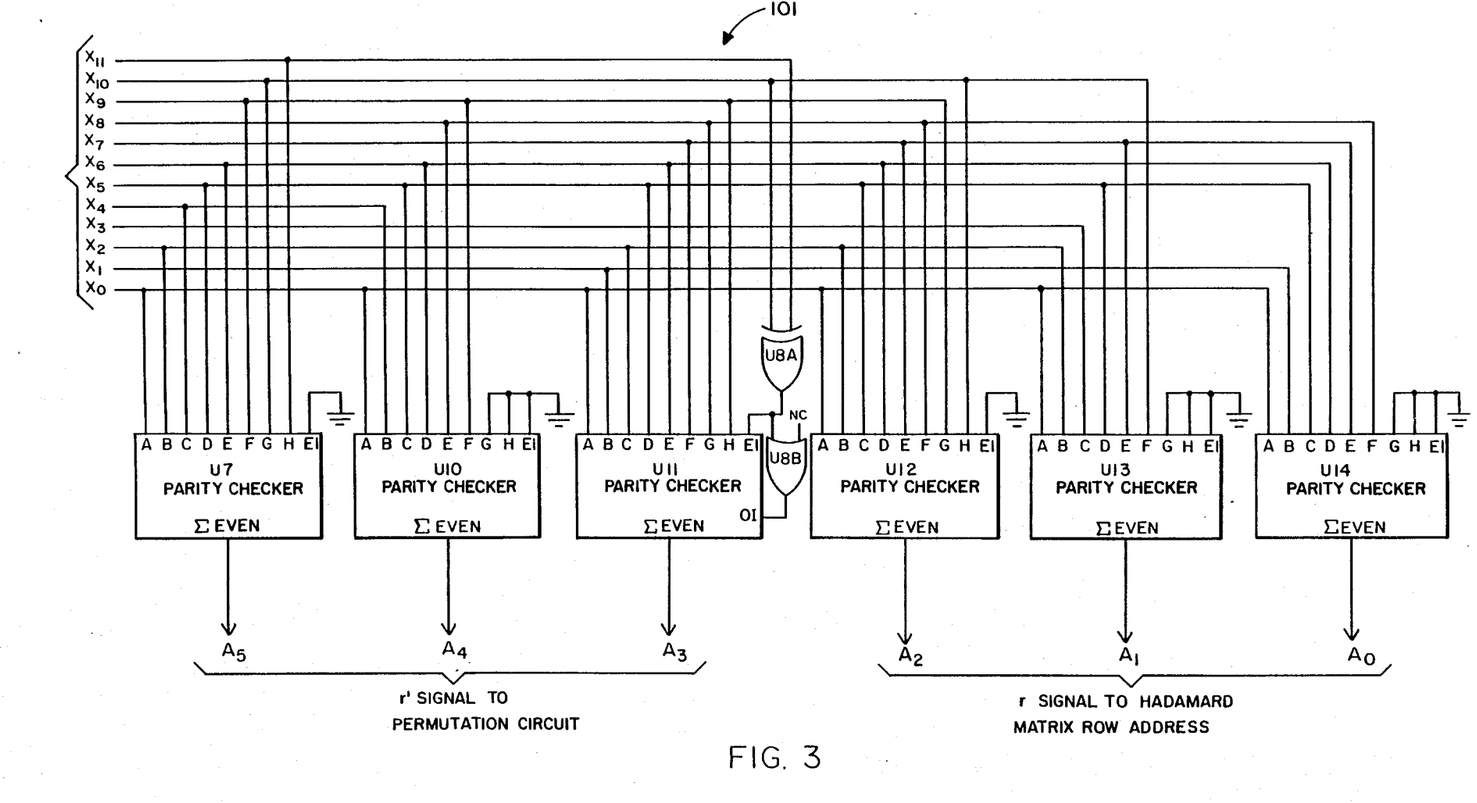

Referring now to FIG. 3, there is shown a more detailed version of the linear transformation device 101 in FIG. 1. In this circuitry, the signals XO through X11 from the register in FIG. 2 undergo a linear transformation. That is, the signals in lines $X_0$ through $X_{11}$, which are considered as a vector, are multiplied by a matrix of 0's and 1's. Multiplication is performed by the circuitry in FIG. 3. Each of the parity checkers U9, U10, U11, U12, U13 and U14 is connected to receive a different combination of up to eight of the twelve signals X0 through X11. This relationship will correspond to multiplying by a different row of the matrix. For example, parity checker U9 corresponds to multiplying by the top row of the matrix and parity checker U14 corresponds to multiplying by the bottom row of the matrix. Each one of the connections represented by a black dot represents a 1. Those lines where there is no connection represent a 0. For example, at checker U9, the lines X11, X10, X9 X6, X5, X4, X2 and XO are all tied to an input of U9. Conversely, lines X8 and X7 are not. The first three that are 1's correspond to the fact that X11, X10 and X9 are connected and the next two that are 0's correspond to the fact that X8 and X7 are not connected. Those two correspond to 0. Thus, the way the matrix multiplication is represented in 0's and 1's is whether or not the lines correspond to that element of the vector input are connected. Therefore, these parity checkers and the lines from XO through X11 implement the following modulo 2 matrix multiplication:

$$\begin{bmatrix} 1 1 1 0 0 1 1 1 0 1 0 1 \\ 0 0 1 1 0 1 1 1 0 0 0 1 \\ 1 1 1 1 1 1 1 0 0 1 1 1 \\ 0 1 1 1 1 1 1 0 0 1 0 1 \\ 0 1 0 0 1 0 1 0 1 1 0 1 \\ 0 0 0 1 1 1 1 0 0 0 1 1 \end{bmatrix} \begin{bmatrix} X0 \\ X1 \\ X2 \\ X3 \\ X4 \\ X5 \\ X6 \\ X7 \\ X8 \\ X9 \\ X10 \\ X11 \end{bmatrix} = \begin{bmatrix} A0 \\ A1 \\ A2 \\ A3 \\ A4 \\ A5 \end{bmatrix}$$

This matrix is derived from Galois Field theory and linear algebra. Note that this matrix uses one set of parameter choices. Other parameter settings will yield different matrixes that yield a bent sequence.

Figure 4A:
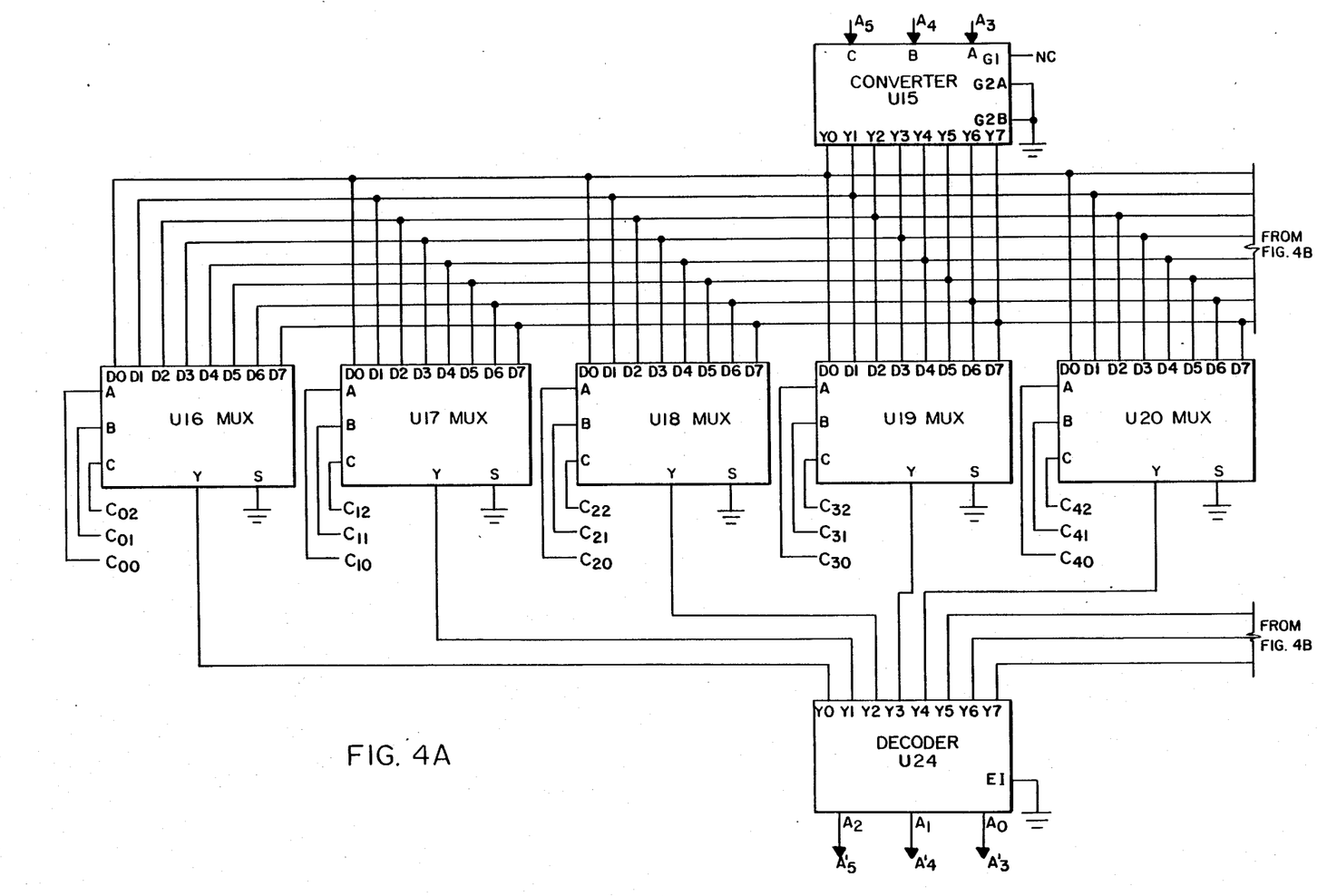
Figure 4B:
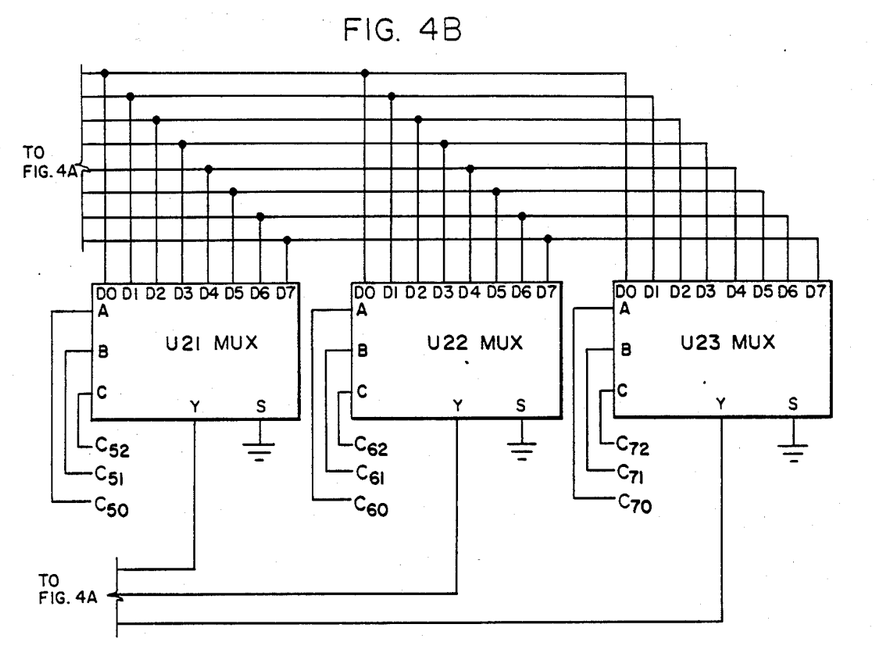

In operation, the parity checkers U9 through U14 look at the signals on the lines connected thereto and determine if the sum is odd or even. An even sum causes the parity checkers to produce an output of 1. An odd sum will produce an output of 0. The output signals AO, A1, A2, A3, A4 and A5 comprise the length n/2 vector output of the linear transformation device 101. These output signals are supplied to the next blocks as shown in FIG. 1. In particular, the vector is split up into signals A0, A1 and A2 which are collectively interpreted as an integer 0 through 7 and is used as the r signal which is applied to the Hadamard matrix 103. The other outputs A3, A4 and A5 (also interpreted as an integer 0 through 7) form the r' signal which is sent to the permutation block 102. Of course, this circuitry can be implemented in a gate array version using VLSI techniques by using Exclusive-OR gates in the implementation of the parity checkers. Referring now to FIG. 4, there is shown a detailed version of the permutation device 102 shown in FIG. 1. The signal lines A3, A4 and A5, which corresponds to signal r' from FIG. 3 are supplied to the converter U15 which converts the three bits present on lines A3, A4 and A5 into a number from 0 to 7. In response thereto, exactly one of the lines labelled YO through Y7 at the output of converter U15 goes high (binary 1) and the others go low (binary 0). The outputs of converter U15 are supplied to each of the seven multiplexers labelled U16 through U23. However, because of the operation of converter U15, One of the lines into each of the multiplexers U16-U23 is high and the others are all low. Also, only one of the multiplexers is able to pass the high line signal. That is, the switches CO0, CO1 C02 and so on are set to represent a permutation vector. For example, if the identity permutation vector is set to transform each of the numbers 0 through 7 into the same number (i. e. a 1-to-1 transform), the control inputs CO0, CO1 and C02 of U16 are set to 0. Those of U17 (i. e. C10, C11, C12) are set to 1 (in binary); U18 (C20, C21, C22) are set to 2. Similarly, the control signals are set on each of the multiplexers through U23 which is set to 7. Thus, only one of the multiplexers is activated and passes the high input signal. For example, suppose line Y5 of MUX U15 is high, and the others are all low and the identity transformation exists. In this case, the control inputs C50, C51 and C52 are set to 5 whereupon the output of MUX U21 goes high and the outputs of all the others remain low. This signal is fed into decoder U24 which has the opposite role from MUX U15. That is, decoder U24 interprets the input thereto as a binary number from 0 to 7. In the example, the number supplied to decoder U24 is 5 which is represented by 101 in binary notation. Thus, output terminals A5' and A3' would go high and terminal A4' would go low. Of course, this depends on what permutation is used. If instead, the value 5 is assigned to the number 3, and line 5 out of encoder U15 is high, all of the MUX's would be low except the output of MUX U19 because that is the MUX which assigns 5 to 3. Thus, the output of MUX U19 would go high corresponding to 3 and the output of decoder U24 would be 011, corresponding to a binary 3. As noted, the settings (for example, by switches) of the control inputs define the permutation of the circuit.

Figure 5:
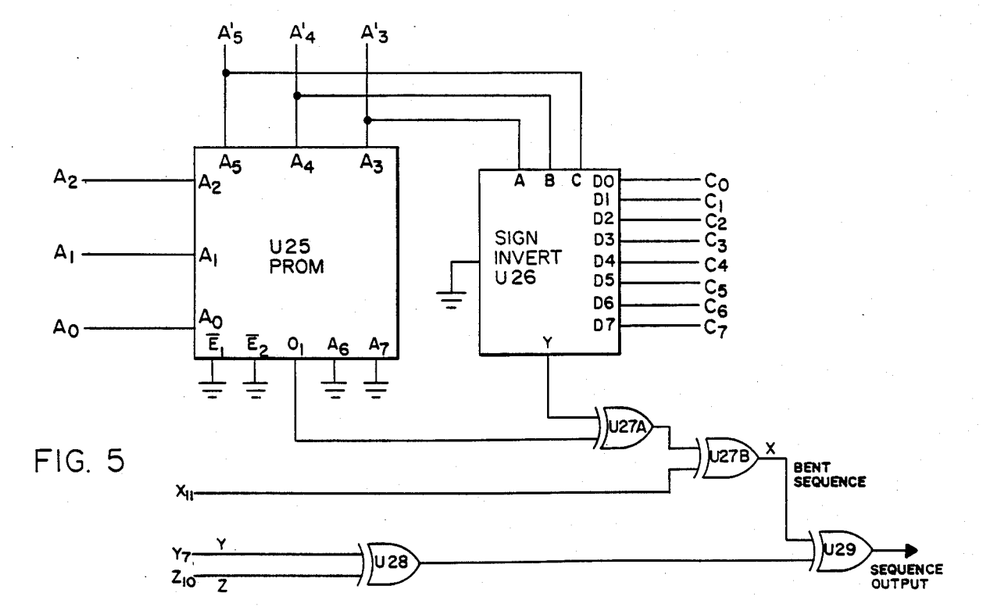

Referring now to FIG. 5, there is shown a more detailed version of the remainder of the circuit shown in FIG. 1. In particular, FIG. 5 receives the row address signals A0, A1 and A2 from the linear transformer 101 of FIG. 3 and the signals A3', A4' and A5' from the permutater 102 of FIG. 4. These signals are used to address, in this case, a programmable ROM or PROM U25. In the preferred embodiment, the values stored in the PROM U25 are he elements of an 8×8 Hadamard matrix. This is a well defined matrix, which is not described in detail herein. The contents of the addressed location in the PROM U25 is read out at the output pin 01.

In addition, the permutation signals A3', A4' and A5' are used to address the sign inversion network U26. In one application, inverter U26 is a dipswitch. Inverter U26 operates to transfer the signal at one of the appropriate terminals D0 through D7 to the output terminal Y. Also, it interprets that value as a decimal number 0 through 7 in accordance with the signals at the control inputs C0 through C7. In a specific example, suppose A3', A4', and A5' were 0,1,1, respectively. The binary number 0,1,1 corresponds to 3, so the appropriate control line is C3. Thus, the input signal C3 which is supplied to terminal D3 is transferred directly to the output Y. If the control signal C3 is a 1, the signal at terminal Y is inverted. If signal C3 is a 0, the signal at terminal Y is not inverted.

The output of inverter U26 is now modulo 02 added with the output of the PROM using an Exclusive-OR gate U27A.

The output of Exclusive-OR gate U27A is connected to the input of Exclusive-OR gate U27B. The other input terminal of gate U27B is connected to receive the signal $X_{11}$ which represents the last entry in the last stage of the shift register 100 (see FIG. 2). The output from Exclusive-OR gate U27B is the bent sequence code produced by the circuit of the instant invention.

In order to produce a composite code sequence, additional sequences, e.g. m-sequence codes, can be combined with the bent sequence code by means of Exclusive-OR gates U28 and/or U29, as desired.

Thus, there is shown and described a new and unique code generator system. This system is capable of providing a bent sequence code which has greater security and flexibility than is obtainable with m-sequence PN codes. The description of the system has been primarily directed to an MSI or hybrid construction. It should be understood that the system is also readily adaptable to VLSI fabrication techniques. Thus, the system can be implemented in gate array logic or the like. Some examples have already been described. In addition, the parity checkers of the tranformation circuit can be replaced by Exclusive-OR gates to perform the linear transformation. Likewise, the multiplexers of the permutation circuit can be replaced by gate array logic. In fact, the overall system construction can be accomplished with TTL circuitry or the like. Thus, even though a preferred embodiment of the invention has been described, other circuit configurations and modifications may be derived by those skilled in the art. However, any such modifications which fall within the purview of this description are intended to be included therein as well. The scope of the invention is not limited by the description thereof, but rather, is limited only by the scope of the claims appended hereto.

We claim:

1. A code generator comprising, register means for supplying an n length signal, transformation means for receiving said n length signal and transforming same into two n/2 length signals, permutation means for receiving one of said n/2 length signals and permuting same into a permutted signal, storage means for storing signals, said storage means connected to receive said permutted signal from said permutation means and the other one of said n/2 length signals from said transformation means, first summing means connected to the outputs of said storage means and said permutation means, sign inversion means selectively connected between said permutation means and said first summing means, second summing means connected to receive the output from said first summing means and a portion of said n length signal from said register means in order to produce a coded output signal.

2. A method of producing a coded signal comprising, producing an n length signal, transforming said n length signal into a plurality of n/m length signals using any transform that will yield a bent sequence, permutting one of said plurality of n/m signals, supplying one of said n/m length signals and said permutted signal to a storage means to select the contents of a portion of said storage means, combining the selected contents of the storage means with the permutted n/m length signal to produce a combined signal, and combining a portion of said n length signal with the combined signal to produce the coded output signal.

3. The method of claim 2 including, selectively inverting the sign of the contents of said storage means prior to the first combining step.

4. The generator recited in claim 1 wherein, said register means includes a plurality of bistable stages.

5. The generator recited in claim 4 wherein, said bistable stages include flip-flop means.

6. The generator recited in claim 1 wherein, said transformation means includes a plurality of devices each connected to receive a portion of said n length signal from said register means and operative to produce a portion of each said n/2 signal as a function of the signals supplied thereto.

7. The generator recited in claim 6 wherein, said devices each comprise a parity checker circuit which produces an output signal representative of the input signals supplied thereto by said register means.

8. The generator recited in claim 1 wherein, said permutation means includes a plurality of circuit devices which produce different output signals in response to prescribed input signals in accordance with a control signal supplied thereto.

9. The generator recited in claim 8 including, control means for supplying said control signal to said circuit devices.

10. The generator recited in claim 1 wherein, said storage means comprises a memory device which stores a Hadamard matrix function.

11. The generator recited in claim 10 wherein, said storage means comprises a ROM.

12. The generator recited in claim 1 wherein, said first summing means comprises a modulo 2 adder.

13. The generator recited in claim 12 wherein, said second summing means comprises a modulo 2 adder.

14. The generator recited in claim 1 wherein, said second summing means is connected to receive the last bit of said m length signal.

15. The generator recited in claim 13 wherein, each of said first and second summing means comprise at least one Exclusive OR gate.

16. The generator recited in claim 1 wherein, said storage means includes rows and columns of storage elements, and
said permuted signal from said permuation means is used to address the columns of said storage means,
said other one of said n/2 length signals from said transformation means is used to address the rows of said storage means.

17. The generator recited in claim 1 including, code sequence signal source means, and
third summing means connected to receive the coded output signal from said second summing means and code sequence signals from said code sequence signal means and to produce a composite pseudo-noise signal.

18. The generator recited in claim 5 including, a plurality of Exclusive-OR gates connected to receive signals from different flip-flop means and to supply signals to the inputs of flip-flop means in adjacent stages.

19. The generator recited in claim 18 including, NOR gate means connected to receive signals from each of the flip-flop means in said register means and to supply a signal of the flip-flop means in the first bistable stage in said register means.

20. The generator recited in claim 18 wherein, each of the flip-flop means produces a signal which is supplied to the transformation means.

21. The generator recited in claim 7 wherein, a first plurality of parity checker circuits are connected to supply said permutation means, and
a second plurality of said parity checker circuits is connected to supply signals to said storage means.

22. The generator recited in claim 8 wherein, said circuit devices comprise multiplexer means.

23. The generator recited in claim 22 including, converter mean for converting the signals from said transformation means into a prescribed number signal representative of the value of the signals from said transformation means and connected to supply said number signal to said multiplexer means for selective transfer therethrough in response to the control signals supplied to said multiplexers.

24. The generator recited in claim 23 including, decoder means connected to receive signals from said multiplexer means and to convert these signals to output signals representative of the signals supplied to said converter means by said transformation means.

* * * * *

UNITED STATES PATENT AND TRADEMARK OFFICE
CERTIFICATE OF CORRECTION

PATENT NO. : 4,685,132

DATED : Aug. 4, 1987

INVENTOR(S) : F. Avery Bishop et al.

It is certified that error appears in the above-identified patent and that said Letters Patent is hereby corrected as shown below:

On the Title Page, Item [75] add:

-- Craig K. Rushforth, Kaysville, UT. --

Signed and Sealed this

Twenty-eighth Day of June, 1988

Attest:

DONALD J. QUIGG

Attesting Officer

Commissioner of Patents and Trademarks